W. N. SENSEMAN.
SHIPPING TAG.
APPLICATION FILED APR. 24, 1911.
1,005,894.
Patented Oct. 17, 1911.
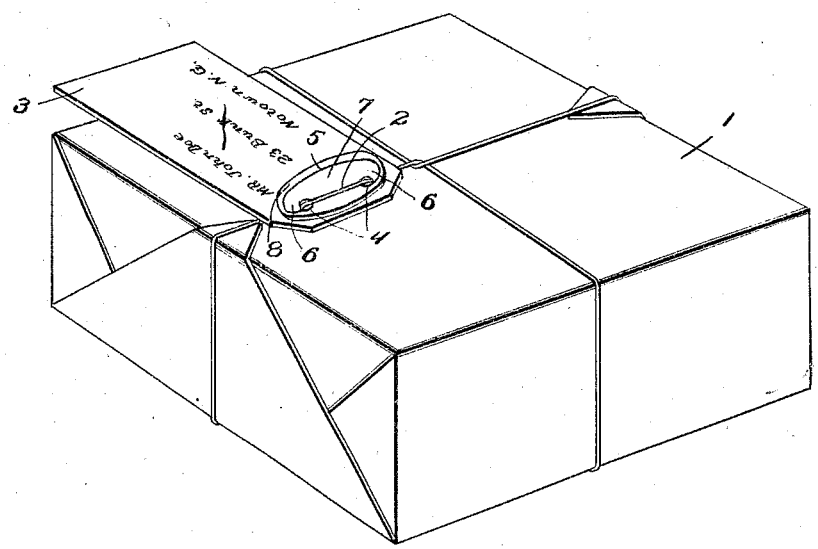
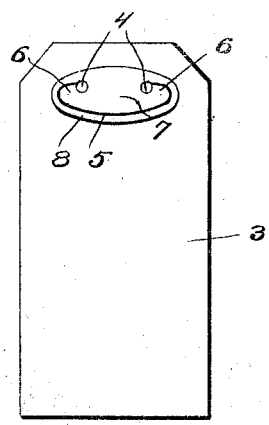
Witnesses
H. Strauss
R. H. Krenkel
Inventor
Walter N. Senseman
By Joshua R. H. Potts

UNITED STATES PATENT OFFICE.

WALTER N. SENSEMAN, OF CAMDEN, NEW JERSEY.

SHIPPING-TAG.

1,005,894.

Specification of Letters Patent. Patented Oct. 17, 1911.

Application filed April 24, 1911. Serial No. 622,920.

*To all whom it may concern:*

Be it known that I, WALTER N. SENSEMAN, a citizen of the United States, residing at Camden, in the county of Camden and State of New Jersey, have invented certain new and useful Improvements in Shipping-Tags, of which the following is a specification.

My invention relates to improvements in shipping tags, the object of the invention being to provide a tag which may be positioned on a cord after the cord is secured around the package, and which will securely hold itself in place on said cord.

A further object is to provide a shipping tag which dispenses with the ordinary cord secured thereto, and which is of extreme simplicity and cheapness of manufacture.

With these and other objects in view, the invention consists in certain novel features of construction and combinations and arrangements of parts, as will be more fully hereinafter described and pointed out in the claims.

In the accompanying drawings: Figure 1, is a perspective view showing my improvements in operation, and Fig. 2, is a view of the tag removed.

1, represents a package and 2 a cord tied around the same.

3 is my improved shipping tag which is provided at one end with two openings 4, spaced apart and connected by a slit 5, which extends in somewhat elliptical form, the ends of the ellipse being beyond the openings 4, and the ends of the slit connected with the openings 4 at points nearest the shorter end of the tag. The openings 4 are circular, preferably, and by reason of the point of connection between slit 5 and the openings, hook shaped portions 6 are provided, which serve to prevent a disconnection between the tag and the cord, as will now be explained.

To secure the tag on a tied package, it is simply necessary to depress the tongue portion 7, formed by openings 4 and slit 5, and then move the tag longitudinally until the cord 2 is positioned in openings 4. When in this position, by reason of the fact that the grooved ends of slit 5 project outwardly beyond the openings 4, and by reason of the hooked shape of the ends of tongue 7 as above explained, any movement of the tag will not release the same. In other words, a longitudinal movement of the tag in either direction would not release the tag, and no movement save a depression of the tongue 7, will release the tag from the cord. The tag therefore will have a very secure connection with the package without the necessity of tying the tag to the package.

The tag is preferably provided at its perforated slotted portion with a reinforcement 8 where the tag is of paper, but where it is of leather or other material, this reinforcement will not be necessary.

Having thus described my invention, what I claim as new and desire to secure by Letters Patent is:

1. As a new article of manufacture, a shipping tag having two openings therein, and a curved slit connecting said openings, said slit having its end portions curved outward beyond the openings, and the ends of said slit communicating with said openings, substantially as described.

2. As a new article of manufacture, a shipping tag having two relatively large openings adjacent one end of the tag, and a curved slit of approximate elliptical form having the inner ends of said slit communicating with the outside edges of said openings, whereby the tongue formed by said slit and openings has its ends projecting outwardly beyond the openings and terminating at the openings in hook shape, substantially as described.

In testimony whereof I have signed my name to this specification in the presence of two subscribing witnesses.

WALTER N. SENSEMAN.

Witnesses:
CHAS. G. JESSUP,
WM. H. SENSEMAN.